Nov. 19, 1935.   H. C. WAUGH   2,021,247
LIQUID PROPORTIONER
Filed Oct. 2, 1923   2 Sheets-Sheet 1
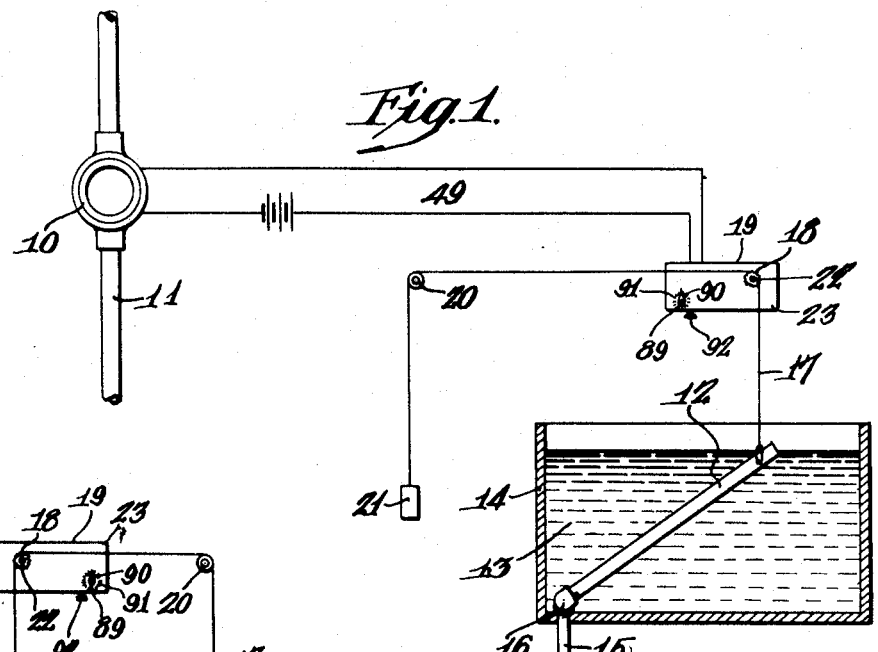
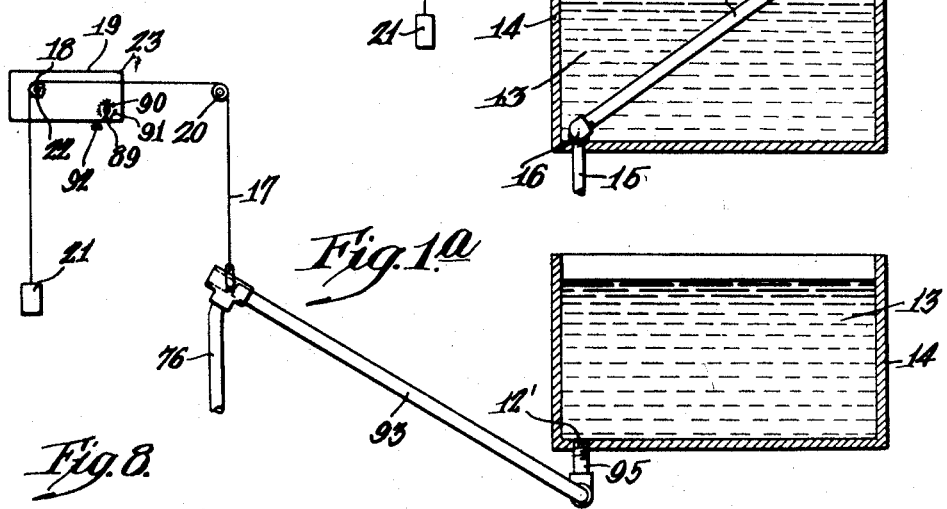
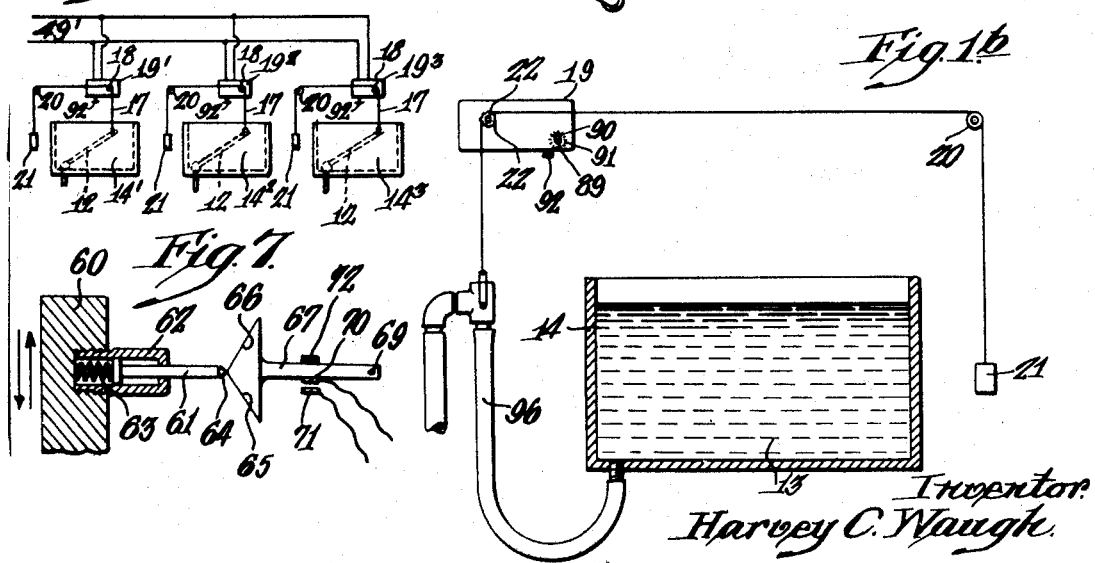
Inventor
Harvey C. Waugh Nov. 19, 1935.  H. C. WAUGH  2,021,247
LIQUID PROPORTIONER
Filed Oct. 2, 1923  2 Sheets-Sheet 2
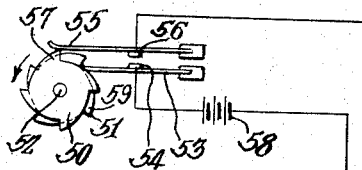
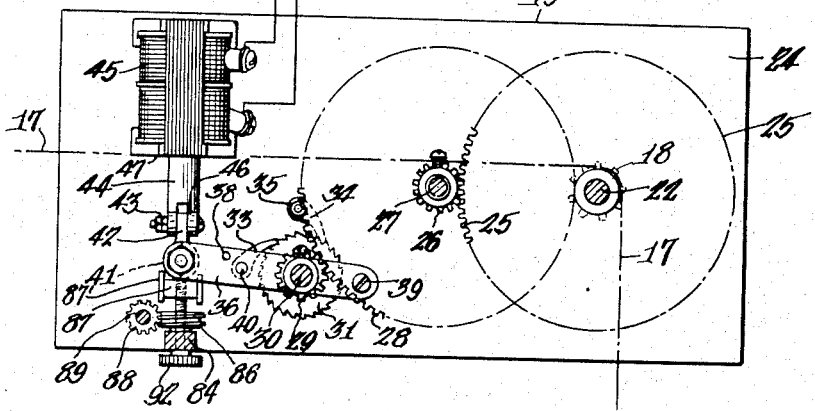
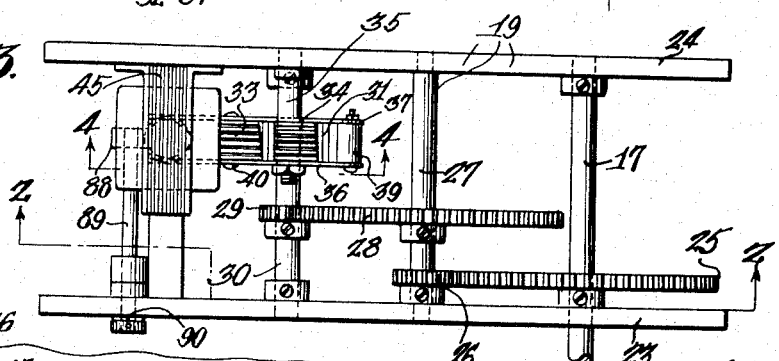
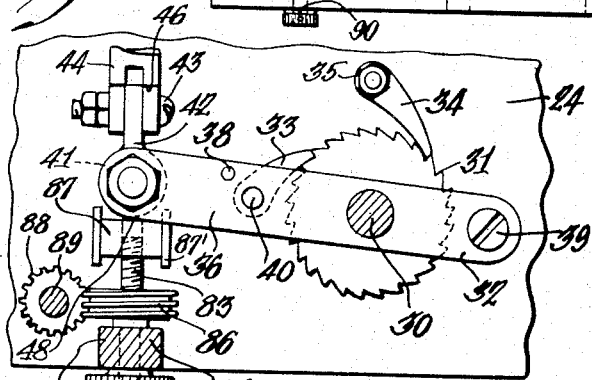
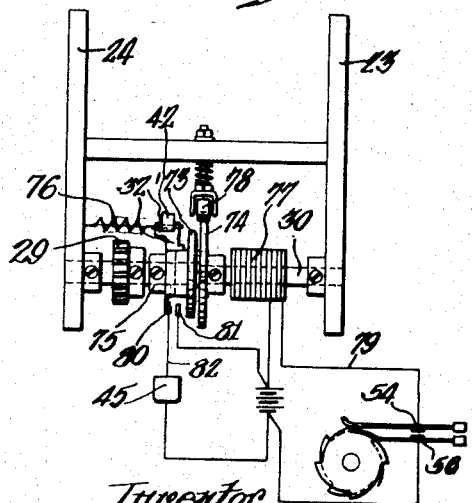
Inventor
Harvey C. Waugh
by  Attorney Patented Nov. 19, 1935

2,021,247

UNITED STATES PATENT OFFICE 2,021,247

LIQUID PROPORTIONER

Harvey C. Waugh, Llanerch, Pa., assignor to American Water Softener Company, Philadelphia, Pa., a corporation of New Jersey Application October 2, 1928, Serial No. 309,882

22 Claims. (Cl. 210—30)

My invention relates to a liquid proportioner with particular reference to a proportioner adapted to control the rate of lowering of an outlet member of a tank.

A purpose of my invention is to use the operation of a meter operated by and preferably measuring one flow to control a flow through an outlet conduit from a receptacle by controlling the rate of lowering a high portion of the conduit.

A further purpose is to electrically connect a meter measuring one flow with control mechanism for lowering a tank outlet member in order to determine the rate of flow from the tank.

A further purpose is to downwardly feed a tank outlet member by an electrically operated ratchet controlled in its operation by a meter measuring another flow.

A further purpose is to provide novel means for adjusting the relation between the movements of a meter measuring one flow and the rate of lowering of a tank outlet controlled by the operation of the meter.

A further purpose is to provide a visible indicator showing the relation between the rate of movement of a meter and the rate of downward movement of a tank outlet adjustably controlled by the operation of the meter.

A further purpose is to use solenoidal operating means for a circuit adapted to control the rate of lowering of a tank outlet by the operation of a meter operated by another flow and to provide a novel form of make and break electrical connection at the meter to insure better operation of the solenoid.

A further purpose is to use a single meter to control the rate of lowering of a plurality of outlet pipes from a plurality of liquid containers.

Further purposes will appear in the specification and in the claims.

I have elected to show one form only of my invention, with minor detail modifications and have selected a form that is convenient and efficient in operation and which well illustrates the principles involved.

Figure 1 is a diagrammatic assembly view showing my invention applied to maintaining a delivery flow from a receptacle in definite relation to another flow under measurement by a meter.

Figure 1a is a fragment of Figure 1 but illustrating a different form of outlet from the receptacle.

Figure 1b is a view corresponding to Figure 1a but showing a slightly different form of receptacle outlet.

Figure 2 is an enlarged vertical elevation through proportioning mechanism of Figure 1, and including diagrammatic electrical connections from the mechanism to the meter, a fragment only of the meter being shown.

Figure 3 is a top plan view of structure shown in Figure 2.

Figure 4 is an enlarged fragment of Figure 2 showing ratchet structure for operating the downward feed of the tank outlet member.

Figure 5 is a top plan view of Figure 4.

Figure 6 is a fragmentary end view of a modified detail showing an electro-magnetic clutch that is intended to be alternative with ratchet mechanism shown in Figures 4 and 5.

Figure 7 is a modified detail showing another form of make and break connections for use with a reciprocating meter element instead of the more usual rotary meter element shown in Figure 2.

Figure 8 is a diagrammatic view showing a single meter simultaneously controlling the rates of lowering of the pipes from a plurality of liquid containers.

Like numerals refer to like parts in all figures.

Describing in illustration and not in limitation and referring to the figures:—

My invention is directed to a novel and convenient means for obtaining a delivery from a tank proportional to a flow that is itself proportionate to the operation of a meter, by using the meter to control a downward feed of one end of a tank outlet conduit in such a way that the delivery from the tank through the gradually descending outlet member is proportional to the flow at the meter.

I anticipate that my invention will find its widest application in water treating for use in delivering chemical solution out of a tank into a stream of raw water at a rate proportional to the main stream of raw water.

However, I realize that in its broader sense it is adapted to many different uses, being directed at any meter control of the rate of lowering of a tank outlet member for effecting a discharge from the tank continuously proportionate to any other flow that is proportionate to and preferably measured by the operation of the said meter.

In Figure 1 a meter 10 in a conduit 11 is operatively connected to mechanism adapted to downwardly feed an outlet member 12 in order to discharge liquid 13 from a tank 14 through a pipe 15, at a rate of flow proportionate to the rate of downward feed of the member 12, and to the rate of movement of the meter 10.

The major portion of the pipe 15 is shown inside the tank, horizontally hinged at one end at 16 by means of spaced L's and an intermediate nipple, a discharge portion of the pipe passing through the bottom of the tank, and the swinging portion of the pipe inside the tank presenting an open inlet end of the pipe at any desired elevation above the bottom of the tank.

The inlet end of the pipe is suspended by a sprocket chain 17 which passes from its connection with the pipe upwardly over a sprocket pinion 18 that forms part of my lowering mechanism 19 and thence over an idler pulley 20, desirably carrying a counterweight 21 at its outer end.

The chain 17 is positioned longitudinally by suitable rotary movement of the pinion 18 and is rigidly mounted on the outer end of a shaft 22 which extends transversely between and is given journal support by the spaced side plates 23 and 24. The shaft 22 carries a large pinion 25 which meshes with a small pinion 26 on a shaft 27 parallel to the first shaft and also carrying a large pinion 28 that meshes with a small pinion 29 upon a shaft 30.

The shafts 30, 27 and 22 are parallel shafts journaling in the plates 23 and 24 and with the gear wheels form a reduction train from a ratchet wheel 31 that is rigidly mounted on the shaft 30 to the sprocket pinion 18 suspending the outlet member 12.

The cooperating ratchet members include a rocker arm 32 which gives pivotal support to operating pawls 33, and retaining pawls 34 which are pivotally mounted upon a post 35 from the side plate 24.

The rocker member 32 is loosely pivoted upon the shaft 30 (see Figure 4) and comprises horizontally spaced parallel plates 36 and 37 which are rigidly fastened together by the spacing posts 38 and 39, by a post 40 that affords pivot support for the operating pawls 33 and by a post 41 which forms a pivot for the lower end of an upwardly extending link 42 that is pivotally fastened at 43 to the lower end of an armature 44 of a solenoid 45.

The plates 36 and 37 make journal connection with the shaft 30 at opposite ends of the ratchet wheel 31.

The armature 44 of the solenoid is normally in a vertically adjustable low position and energization of the solenoid effected by the operation of the meter raises the armature and the outer end of the rocker arm 32 to give the ratchet member a forward feed in a direction to lower the outlet member 12, the amount of this forward feed being adjustable by changing the retracted or low position of the rocker arm.

The solenoid 45 may be of any suitable or commercial type that is adapted to give a range of movement to the armature 44 sufficient to feed the ratchet.

The solenoid armature moves to a definite stop at the upper end of its stroke, shoulders 46 at its lower end engaging the bottom of casing structure 47 of the solenoid when the armature is in its raised position, and in low position the armature is supported by a vertically adjustable stop member 48 that is vertically adjustable in order to control the length of the stroke of the ratchet member.

The meter 10 of the conduit 11 may be of any suitable or commercial type, either rotary or reciprocating. In practice, meters of both types usually have a rotary member that operates a series of dials that give a reading of an integrated flow through the meter.

I may make any suitable movable part of the meter close and open an electric circuit 49 of the solenoid 45 at intervals variant with and inversely proportional to the rate of movement of the meter in order to effect a downward ratchet feed of the outlet member 12 at a rate proportionate to the rate of movement of the meter.

In the desirable form shown in Figure 2 I mount special contact cams 50 and 51 on a rotary shaft 52 of the meter 10, the shaft 52 being preferably the dial operating shaft of the meter 10.

The cams 50 and 51, rigidly mounted adjacent to one another on the shaft 52, are disc step cams that are respectively engaged by a spring member 53 carrying a contact member 54 and by a cooperating spring member 55 that carries a contact member 56.

The contact members 54 and 56 are of the electric circuit 49 which is open or closed according to whether the contact members are separated or together.

The contours of the cams are generally similar, each including a series of abrupt steps and gradual approach portions, the steps of one cam being relatively staggered with respect to those of the other.

The contacts 54 and 56 are brought together when the spring 55 flies inward at the steps of the cam 51 and are separated when the spring 53 flies inward at the steps of the cam 50.

In the position shown in Figure 2, the contact members 54 and 56 are open and the spring members 53 and 55 are supported so that their free ends rest against the respective cams.

The shaft 52 carrying the cams continuously rotates during the operation of the meter 10 and at a period a little subsequent to that indicated in Figure 2, additional angular movement of the shaft 52 in the direction of the arrow brings the step 57 to the end of the spring 55 which permits this spring to fly towards its cooperating spring 53 thereby bringing the contact 56 into engagement with the contact 54 and closing the circuit 49 through a battery 58 and the solenoid 45, energizing the solenoid to lift the armature 44 up into the solenoid which forwardly feeds the ratchet shaft 30.

The meter continuing in its movement in the direction of the arrow brings the step 59 on the cam 51 to the end of the spring 53 which then flies inward away from the first spring to effect a quick break of the circuit.

The solenoid is de-energized when the circuit breaks and the armature 44 drops to its original position upon the stop 48.

In both make and break of the contacts 54 and 56 there is an advantageous snap action that insures a correspondingly clean cut operation of the solenoid.

In certain cases it may not be convenient to use a rotating member to effect the making and breaking of the solenoid circuit and for this reason I show in Figure 7 a form of make and break that is adapted to be operated by any suitable reciprocating portion of any meter.

The member 60 is intended to represent any member reciprocating responsively to the meter that is to be used to control the downward feed of the tank outlet.

The reciprocation is in the direction of the arrows and the member carries an outwardly projecting point member 61 that is adapted to slide along a suitable guide 62 rigidly fastened to the member 60, the direction of sliding being lateral with respect to the movement of the member 60.

The point member is spring-pressed outwardly at 63 and presents its point 64 continuously against one or other of the sloping surfaces 65 or 66 that are presented by a rocker member 67.

The lengths of the sloping surfaces 65 and 66 are accommodated to the range of movement of the member 60, the point 64 always engaging one or other of the sloping surfaces.

The rocker 67 is pivoted at 69, carries a contact 70 of the circuit 49 and has a limited range of movement, being adapted to place the contact 70 against a mating contact 71 when pushed in one direction and to engage a suitable stop member 72 when pushed in the reverse direction.

It will be seen that whenever the point 64 is pressing against the surface 65 of the rocker member it presses the rocker against the stop 72 with the contact members 70 and 71 separated and that whenever the point is engaging the slope 66 it pushes the rocker in a reverse direction, to bring the contact members together to energize the circuit 49.

There is a snap reversal in position of the rocker whenever the point 64 passes the apex of the rocker, and there is thus afforded a clean-cut break if the point is moving in one direction when it passes the apex and a clean-cut make when it passes the apex in the reverse direction.

The form of ratchet connection between the rocker 32 and the shaft 30 may be widely varied, but that shown in Figure 2 is particularly convenient and adapted to easy manufacture and efficient use.

The spaced plates 36 and 37 loosely journal upon the shaft 30 at opposite ends of the ratchet wheel 31 which is fastened to the shaft, and the operating pawls 33 comprise a series of step pawls which are pivotally mounted upon the pin 40 between the plates. They are of progressively different lengths in order to lessen any lost motion between the pawls and the ratchet.

Any lost motion due to failure of any one of the pawls to exactly register with the rearward surface of the adjacent tooth of the ratchet will be less than the distance between successive ratchet teeth divided by the number of step pawls carried on the pin, as the successive pawls engage the ratchet wheel at progressively different points between adjacent teeth of the ratchet wheel.

The retaining pawls 34 which operate to prevent return movement of the ratchet wheel during the retraction of the rocker 32 may be in every way like the pawls carried on the rocker member.

The retaining pawls 34 then comprise a corresponding series of pawl members pivoted upon the fixed post 35 and that have retaining points of engagement with the ratchet teeth exactly subdividing the distance between adjacent teeth of the ratchet.

I show in Figure 6 one of the many other different arrangements that may be used for transmitting the angular reciprocating movement of the rocker 32 into the one-direction rotation feed of the shaft 30 on which the rocker journals.

The rocker arm 32' adapted to be rocked by the solenoid 45 is journaled upon the shaft 30, carries a friction disc 73 rigidly fastened to it and is free to move a short distance longitudinally of the shaft 30, presenting the friction disc 73 either against or away from a cooperating disc 74 that is fastened to the shaft 30.

The movement of the rocker 32' axially of the shaft 30 is limited on one side by a collar 75 fastened to the shaft and upon the other side by the disc 74, also fastened to the shaft 30.

A spring 76 between the plate 24 and the inner end of the rocker maintains the rocker normally against the collar 75, in which position the opposing faces of the discs 73 and 74 are somewhat apart.

The disc 73 carried by the rocker comprises or carries an armature for an electro-magnet 77 which loosely surrounds the shaft 30 and may desirably be fastened stationary in any suitable way from the casing plates.

When the magnet 77 is energized its pull upon its armature (the magnetic disc 73) brings the disc 73 into contact with the cooperating disc 74 fastened upon the shaft 30, thus temporarily fastening the discs together so that the shaft turns with the rocker when the rocker is lifted.

The rocker 32' is normally pulled to the left axially of the shaft by the spring 76 and is adapted to be pulled to the right by the magnet 77 whenever the magnet is energized and retracted by the spring whenever the magnet is de-energized.

The adjustment of the angular stroke of the rocker member may desirably be exactly as in the other figures and is therefore not shown in Figure 6.

The disc 74 is made of somewhat larger circumference than the cooperating disc 73, and a friction wheel 78, preferably a fiber roller, is shown mounted to engage the outer circumference of the disc 74 to prevent return movement of the larger disc during the return of the rocker member.

The magnet 77 should preferably be energized before the solenoid 45 in order that the disc members 73 and 74 may be in firm engagement before the beginning of the upward movement of the rocker member.

For this reason I make the main circuit which is closed by the movement of the meter to include the magnet 77 operating the clutch disc but not the solenoid 45 that operates the rocker member, and make the movement of the rocker 32' responsive to the energizing of the magnet 77 effect closure of the circuit that energizes the solenoid 45.

In this way when the meter makes circuit at the contacts 54 and 56, the circuit 79 of the magnet 77 is complete and the rocker member is pulled toward the magnet which brings the contact members 80 and 81 into engagement and closes a circuit 82 of the solenoid 45.

The energization of the solenoid 45 lifts the rocker member 32' and effects the downward feed of the outlet member 12.

As soon as the meter contacts 54 and 56 open, the magnet 77 loses its energy and the spring 76 pulls the rocker member back to its original position which opens the circuit of the solenoid 45 thereby releasing the rocker member 32' which returns to its position against the adjustable stop 48.

It will be seen that the discs 73 and 74 and the magnet 77 together form a magnetic clutch and the illustrated form shown in these figures is intended to be a conventional illustration for any electro-magnetic clutch that is adapted to fasten the rocker 32' and shaft 30 together when the clutch is energized and to release when the clutch is de-energized.

It is desirable to be able to widely adjust the downward feed of the tank outlet with respect to the movement of the meter 10 and I accomplish this by adjusting the vertical position of the stop member 48 beneath the end of the rocker member 32.

As illustrated, a small shaft 83 is pivotally mounted at 84 in a transverse portion 85 of the casing structure.

The shaft 83 carries a worm wheel 86 above its bearing 84 and is threaded above the worm wheel, carrying a threaded block 87 that is guided from rotary movement in any suitable way at 87' and presents its upper end against the under side of the rocker 32.

The worm wheel 86 on the shaft 83 meshes with a worm 88 upon a shaft 89 that extends transversely between the plates 23 and 24 having bearing support in the respective plates.

This shaft 89 is extended through the plate 23 where it carries a pointer 90 which is adapted to indicate the vertical position of the block 87, different vertical positions of the block 87 corresponding to different readings of the pointer upon a circumferential scale 91 around the extended end of the shaft 89.

The shaft 83 is downwardly extended through its bearing 84 to carry a suitable knurled thumb wheel 92 which is used for rotating the shaft 83 to vertically set the block 87 to any desired position, a position that is indicated by the reading of the pointer 90 upon the scale 91.

Preferably the reduction ratio between the worm and worm wheel is such as to make the range of the block correspond with one complete circumferential movement of the pointer 90 upon the scale 91.

In Figure 1 I have shown the outlet pipe inside the tank with the inlet of the pipe at the level of the liquid in the tank.

Obviously I may have the vertically movable portion of the outlet conduit outside the tank instead of inside the tank and I illustrate this in Figures 1a and 1b.

In Figure 1a the conduit 93 has a horizontal hinge connection with a pipe 95 that extends downwardly out of the bottom of the tank, and slopes upwardly to an overflow outlet member 12' which is at the level of the liquid inside the tank, is suspended from the chain 17 exactly as in Figure 1, and preferably comprises a T fitting which provides air access to the overflow. Preferably a flexible discharge pipe 76 leads the overflow away to any desired point of discharge.

In Figure 1b the discharge conduit 96 is a flexible tube, the outlet end of the tube being raised to the level of the liquid in the tank 14 and gradually fed downwardly by the operation of the meter in exactly the same way as in Figure 1.

Any of the forms shown may be preferable according to circumstance. Placing the conduit outside the tank avoids the presence of piping inside the tank and locates the lowering mechanism at a little distance from the tank and the use of a flexible conduit avoids the need for horizontal as well as vertical movement of the outlet member at its point of suspension from the chain 17.

Placing the outlet conduit inside the tank gives a more compact arrangement and for this reason may be usually preferable.

In the operation of either form the meter 10 directly or indirectly successively opens and closes an electric circuit of the solenoid 45 at intervals that occur with a frequency directly proportional to the rate of movement of the meter and therefore to the flow through the conduit 11.

Each time the circuit is made the solenoid 45 raises its armature and forwardly feeds the reduction train to downwardly feed the outlet member 12, permitting the liquid to escape from the tank 14 at a rate of flow proportional to the rate of downward feed of the outlet member.

If the mechanical ratchet feed illustrated in Figures 2 to 5 is used the solenoid 45 is in the same circuit with the contacts at the meter but when a magnetic clutch is used as shown in Figures 6 and 7 I make the circuit that energizes the clutch include the contacts at the meter and use the movement of the rocker to close the circuit that lifts the rocker in order that the clutch may be fully operative before the rocker is lifted by the solenoid 45.

It will be understood that throughout the specification and claims I have used the term "meter" as meaning any member that moves proportionally to any flow to which a second flow to be delivered from a tank is to be kept substantially proportional.

The meter may or may not have a dial or other means for giving reading of the main flow to which the second flow is to be proportionate and may either operate or be operated by the main flow.

One of the chief aims of the invention is to maintain proportionality between the two flows irrespective of whether or not either flow is actually measured.

It will be evident however that the actual measurement of the main flow may be readily determined from the number of times the tank 14 that delivers the second flow is filled and discharged, provided proper account is also taken of the content of the tank 14, of the setting of the stroke of the rocker member 32 and of the number of times the operating circuit is closed and opened for a given flow at the meter 10.

My invention is particularly advantageous in its adaptation to simultaneously control the lowering of the raised lift-pipe outlet members 12 from any desired number of liquid containers by means of a single meter, preferably the main meter, and I have illustrated this application in Figure 8.

In Figure 8 a circuit 49¹ from any meter 10, the meter not shown in Figure 8 but shown in Figure 1 and normally the meter in the main carrying the flow of water that is under treatment, is connected to the lowering mechanisms 19¹, 19² and 19³ of the treating-liquid containers 14¹, 14² and 14³ to simultaneously control the discharge from these containers by means of the operation of the meter.

A notable advantage of this arrangement is the independent adjustment 92 at each of the lowering mechanisms. This permits independent adjustments of the different proportional rates of delivery, the proportion delivered from any one tank being adapted to be changed without affecting the proportional deliveries from the other tanks or in any way interrupting the simultaneous control from the meter 10.

As the operation is exactly as already described and as the liquid containers and the lowering mechanisms shown in Figure 8 are intended as a conventional illustration for any containers and lowering mechanisms adapted to operate in the way indicated, it will be unnecessary to describe their operation in further detail.

The meter contacts may be as indicated in Figure 2 or as indicated in Figure 7 or may comprise any suitable arrangement that adapts the meter to open and close the circuit 49 in order to effect a progressive lowering of the raised outlet pipes by means of the suitable lowering mechanisms 19¹, 19² and 19³.

The control of the lowering of an outlet lift pipe by the operation of a main meter as distinguished from its control by the operation of a fractional meter, which is likely to be stopped up by leaves, is a very desirable feature of my invention.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. A meter in combination with a tank, a discharge conduit from the tank having a vertical movable portion adapted to determine the liquid height in the tank by its own vertical height, gearing, means operatively connecting the gearing and the vertically movable portion, electromagnetic means for turning the gearing and means connected with the meter for making and breaking an electric circuit through the electromagnetic means.

2. A tank adapted to contain a liquid, a discharge conduit therefrom having a vertically movable portion that is adapted by its vertical height to determine the height of liquid in the tank, a meter distant from the tank, gearing and connection for lowering the vertically movable portion, quick make and break contact mechanism closed and broken by movement of the meter, an electro-magnet, an electric circuit energizing the electro-magnet and passing through the contact mechanism and connection between the electro-magnet and the gearing positively actuating the gearing by movement of the electro-magnet armature.

3. A liquid container, a discharge conduit having a vertically movable portion adapted to determine the level of the liquid in the container by its own vertical height, a wheel, a rotatable shaft carrying the wheel, operative connection between the wheel and the said portion whereby the wheel is adapted to control the vertical height of the said portion, a rocker, clutch mechanism connected with the rocker and with the wheel adapting each forward stroke of the rocker to positively feed the wheel in direction to downwardly feed the said movable portion, a meter and electrically operated mechanism controlled by the operation of the meter for operating the rocker.

4. A meter, a liquid container, a discharge conduit therefrom having a vertically movable portion adapted by its own height to determine the level of the liquid in the container, a wheel, a shaft carrying the wheel, operative connection between the wheel and the said portion of the conduit, a rocker pressing to its retracted position and connected during forward rocking to positively move the wheel in direction to downwardly feed the said portion and during retractive rocking to move without affecting the position of the wheel, a solenoid adapted to forwardly move the rocker, an electric circuit adapted to energize the solenoid and contacts thereon opened and closed by the operation of the meter.

5. A meter, a liquid container, a discharge conduit therefrom having a vertically movable portion adapted by its own height to determine the level of liquid in the container, a wheel, a shaft carrying the wheel, operative connection between the wheel and the said portion of the conduit, a rocker pressing to its retracted position and adapted during each forward stroke to move the wheel in direction to downwardly feed the said portion and during its retractive stroke to move without affecting the position of the wheel, a solenoid adapted to forwardly move the rocker when energized, the rocker retracting when the solenoid is de-energized, an electric circuit adapted to energize the solenoid and contacts therein opened and closed by the operation of the meter in combination with an adjustable stop for adjusting the stroke of the rocker to adjust the downward feed of the said portion during each operation of the solenoid.

6. A meter, a liquid container, a discharge conduit therefrom having a vertically movable portion adapted by its own height to determine the level of the liquid in the container, a wheel, a shaft carrying the wheel, operative connection between the wheel and the said portion of the conduit, a rocker pressing to its retracted position and adapted during each forward stroke to move the wheel in direction to downwardly feed the said portion and during its retractive stroke to move without effecting the position of the wheel, a solenoid adapted to forwardly move the rocker when energized, the rocker retracting when the solenoid is de-energized, an electric circuit adapted to energize the solenoid and contacts therein opened and closed by the operation of the meter in combination with an adjustable stop for adjusting the stroke of the rocker to adjust the downward feed of the said portion during each operation of the solenoid and a dial indicating the position of the adjustment.

7. A meter, a tank adapted to contain liquid, a discharge conduit therefrom having a vertically movable portion that is adapted by its vertical height to determine the height of liquid in the tank, a solenoid and cooperating positive mechanism moved by the operation of the solenoid for downwardly feeding said vertically movable portion by successively energizing and de-energizing the solenoid, an electric circuit for the energizing and de-energizing of the solenoid including a pair of contact members, means operative by the meter for successively snapping the contacts together and snapping them apart and an adjustment within the mechanism cooperating with the solenoid for varying the throw produced by the solenoid to vary the movement of the vertically movable portion for each solenoid energization.

8. A meter, a liquid container, a discharge conduit therefrom having a vertically movable portion adapted by its own height to determine the level of the liquid in the container, and mechanism for downwardly feeding the said portion including a shaft operatively connected to the said portion of the conduit, a rocker pivotally mounted on the shaft, an electromagnetic clutch connection between the rocker and the shaft and electrically operated means controlled by the operation of the meter for operating the clutch and reciprocating the rocker.

9. A meter, a liquid container, a discharge conduit therefrom having a vertically movable portion adapted by its own height to determine the level of the liquid in the container, and mechanism for downwardly feeding the said portion including a shaft operatively connected to the said portion of the conduit, a rocker pivotally mounted on the shaft, an electromagnetic clutch connection between the rocker and the shaft and electrically operated means controlled by the operation of the meter for operating the clutch, and other electrically operated means controlled by the operation of the clutch for reciprocating the rocker.

10. A meter, a tank adapted to contain liquid, a discharge conduit therefrom having a vertically movable portion that is adapted by its vertical height to determine the height of liquid in the tank, a solenoid and cooperating mechanism for downwardly feeding said vertically movable portion by successively energizing and de-energizing the solenoid, an electric circuit for the energizing and de-energizing of the solenoid including a pair of contacts, a spring mount for each contact, a step cam operated by the meter, engaging free ends of both mounts and having steps in the paths of the free ends, to release one mount that it may snap the contacts together at one position of the cam and to release the other mount to snap the contacts apart at another position of the cam.

11. In a water treating mechanism, a main meter, a plurality of containers for different treating liquids distant from the meter, raised take-off pipes from the different containers, a plurality of step-by-step mechanisms controlled by the operation of the meter for lowering the pipes to determine the rates of discharge from the different containers and separate adjustments in the step-by-step extents of movement whereby different pipes may be lowered concurrently to different extents.

12. In a liquid treating system applying a plurality of different liquids, a water flow control means for closing and opening an electric circuit, a circuit so opened and closed, a plurality of containers for different liquids used for treating purposes, a raised take-off pipe from each container, separate step by step means rendered simultaneously operative by the opening and closing of the circuit for downward feeding of each of the pipes to a different distance from the distance the other pipes are fed and means for adjusting each of the feeding means to vary the downward feeds of the different pipes.

13. In a water treating system, a plurality of containers for different water treating liquids, a plurality of take-off feed pipes therefor, one for each container, common electrical control for the feed pipes, and a plurality of independently adjustable electro-magnetically operated mechanisms for lowering the feed pipes, one for each container, whereby the same electrical actuation for the different electro-magnets may lower the different feed pipes concurrently to different extents.

14. In a system for adding chemicals to a liquid, a meter having a rotating shaft, electrical contacts closed by the operation of said shaft at intervals proportionate to the liquid metered, an electro-magnetic mechanism, a circuit including the contacts and the mechanism for operating the mechanism, a feed for chemicals adapted to be varied, connections from the electro-magnetic mechanism to the feed whereby the variation of the feed is effected by reason of the impulses through contacts formed by the meter and an adjustment of the extent of feed effected by reason of each impulse, the adjustment being located between the electro-magnetic mechanism and the feed.

15. In a system for adding chemicals to a liquid, a device responsive to water flow and having a rotary member rotating in proportion to the quantity of flow, contacts closed by reason of the rotation of the member, a circuit closed by the closing of the contacts, an electro-magnetic mechanism operated step by step by energization of the circuit, chemical feeding means connected with the electro-magnetic mechanism whereby a chemical is fed in proportion to the flow of the liquid, and means for adjusting the extent of feed located between the electromagnet and the chemical feeding means.

16. A recording meter for fluids, an interrupted electric circuit, means operated by the meter for closing the circuit, an electro-magnet in the circuit, chemical feeding mechanism operated step by step by the electro-magnet and an adjustment between the contact closing mechanism and the feeding mechanism permitting change in the extent of feeding.

17. A chemical feed, a recording meter for liquids, an electro-magnet having an armature and connections for operating the chemical feed having a normally open electric circuit, quick opening and quick closing contact means closed by operation of the meter for closing said circuit and an adjustment for the stroke of the armature of the electro-magnet.

18. A liquid container, a discharge conduit having a vertically movable portion adapted to determine the level of the liquid in the container by its own vertical height, solenoidal electro-magnetic lifting mechanism and connections for supporting and altering the height of the conduit which determines the level, an electric circuit including the electro-magnetic mechanism, a meter, a contact closed by operation of the meter for passing current through the circuit to operate the electro-magnetic mechanism and stroke limiting adjusting means for the solenoid plunger.

19. Liquid measuring and feeding apparatus comprising, in combination, a container for liquid to be measured and fed, means providing a discharge outlet for the liquid to be measured and fed, electrical means periodically feeding a measured quantity of liquid from the container to the discharge outlet and means for varying the quantity of liquid fed upon each energization of the electrical means.

20. In an electromagnetic feeding mechanism for treating liquids, an electromagnet, meter-closed means for energizing the electromagnet, an armature for the electromagnet, adjustable means below the armature for limiting the downward movement of said armature, feeding mechanism for adding a material to the liquid and gearing connections between the armature and the feeding mechanism operative to make the extent of feed proportionate to the movement of the armature and adjustable by adjustment of the stroke of the armature.

21. In an electromagnetic feeding mechanism for treating liquids, an electromagnet, meter-closed means for energizing the electromagnet, an armature for the electromagnet, stop means connected with the armature to limit the extent of movement of the armature adjustable at one end of the stroke, feeding means for the treating material and gearing connections for supplying the treating material to the liquid in proportion to the stroke of the armature, whereby the adjustment of the armature stroke adjusts the extent of feeding effected.

22. In a chemical supply device, a meter responsive to the flow of the liquid to be treated with the chemical, a feed adapted to introduce chemical into the liquid, electrical contacts periodically closed by the meter, a solenoid, a source of electrical energy, an electric circuit including the electrical contacts, the solenoid and the source of energy, and means for varying the amount of chemical fed upon each change in the electrical condition of the solenoid.

HARVEY C. WAUGH.